US012773833B2

(12) United States Patent
Laffont et al.

(10) Patent No.: US 12,773,833 B2
(45) Date of Patent: Oct. 27, 2026

(54) PROCESS FOR PRODUCING, AT THE END OF A STRUCTURE, A MICRO-OR NANO-COMPONENT MADE OF VITREOUS MATERIAL PRODUCED BY MULTI-PHOTON PHOTOPOLYMERIZATION

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris Cedex 16 (FR); SAFRAN AIRCRAFT ENGINES, Paris (FR); UNIVERSITE DE LILLE, Lille (FR)

(72) Inventors: Guillaume Laffont, Gif sur Yvette (FR); Marc Douay, Villeneuve D'Ascq (FR); Didier Pohl, Moissy-Cramayel (FR)

(73) Assignees: COMMISSARIAT L'ENERGIE ATOMIQUE ET AUX ENERGIES ALTERNATIVES, Paris (FR); CENTRE NATIONAL DE LA RECHERCHE SCIENTIFIQUE, Paris (FR); SAFRAN AIRCRAFT ENGINES, Paris (FR); UNIVERSITE DE LILLE, Lille (FR)

( * ) Notice: Subject to any disclaimer, the term of this patent is extended or adjusted under 35 U.S.C. 154(b) by 91 days.

(21) Appl. No.: 18/862,992

(22) PCT Filed: May 3, 2023

(86) PCT No.: PCT/EP2023/061620

§ 371 (c)(1),
(2) Date: Nov. 5, 2024

(87) PCT Pub. No.: WO2023/213849

PCT Pub. Date: Nov. 9, 2023

(65) Prior Publication Data

US 2025/0289195 A1 Sep. 18, 2025

(30) Foreign Application Priority Data

May 6, 2022 (FR) ...................................... 2204326

(51) Int. Cl.
*B29D 11/00* (2006.01)
*G02B 6/26* (2006.01)
*B29K 509/00* (2006.01)

(52) U.S. Cl.
CPC .... *B29D 11/00663* (2013.01); *B29K 2509/00* (2013.01)

(58) Field of Classification Search
CPC .. B29D 11/00663; G02B 6/262; G02B 1/002; B33Y 10/00; B33Y 30/00; B33Y 40/00; B33Y 50/00; B33Y 70/00
See application file for complete search history.

(56) References Cited

U.S. PATENT DOCUMENTS

2009/0035528 A1* 2/2009 Leatherdale .......... G03F 7/2053 522/170
2018/0281324 A1* 10/2018 Gießen .................. B33Y 10/00
2023/0203326 A1* 6/2023 Wen ..................... C09D 11/101 264/401

FOREIGN PATENT DOCUMENTS

WO WO 2017/059960 A1 4/2017
WO WO 2022/035994 A1 2/2022

OTHER PUBLICATIONS

International Search Report & Written Opinion issued on Aug. 21, 2023, in PCT/EP2023/061620 filed on May 3, 2023, (With English Translation).

(Continued)

*Primary Examiner* — Galen H Hauth
*Assistant Examiner* — Baileigh Kate Darnell
(74) *Attorney, Agent, or Firm* — Oblon, McClelland, Maier & Neustadt, L.L.P.

(57) ABSTRACT

A method of making of an optical device provided with a nano-structured or micro-structured component assembled on one end of an optical fibre includes providing a carrier based on a material photosensitive and transformable into a vitreous material, and making on a first end of the carrier, by (Continued)

two-photon photopolymerization, a micro-structured or nano-structured component, based on a material photosensitive and transformable into a vitreous material. The method also includes performing one or more heat treatment(s) so as to transform the material of the carrier and the material of the micro- or nano-structured component into a vitreous material and, then, assembling and securing a region of a second end of the carrier opposite to the first end with an area of an end of the optical fibre, by localised fusion of the region and the area, respectively of the carrier and the optical fibre.

16 Claims, 7 Drawing Sheets

(56) References Cited

OTHER PUBLICATIONS

Luo et al., "Additive Manufacturing of Glass", Journal of Manufacturing Science and Engineering, vol. 136, 2014, 6 pages.
Kotz et al., "Three-dimensional printing of transparent fused silica glass", Nature, vol. 544, , Apr. 2017, 337-339 (6 pages).
Gaso et al, "Optical fiber tip with integrated mach-zehnder interferometer for sensor applications", Optics and Optoelectronics, vol. 17, No. 4, 2019, pp. 466-471.
Wei et al, "Three-dimensional-printed Fabry-Perot interferometer on an optical fiber tip for a gas pressure sensor", Applied Optics, vol. 59, No. 7, 2020, pp. 2173-2178.
Kotz et al, "Two-photon polymerization on nanocomposites for the fabrication of transparent fused silica glass microstructures", Advanced Materials, 33, Jan. 2021, 5 pages.
Doualle et al, "3D printing of silica glass through a multiphoton polymerization process", Optics Letters, vol. 46, No. 2, 2021, pp. 364-367.
Desponds et al, "Microfabrication by two-photon lithography, and characterization, of $SiO_2/TiO_2$ based hybrid and ceramic microstructures", Nano-structured materials (particles, fibers, colloids, composites, etc.) Jul. 2020, 33 pages.

* cited by examiner

Fig. 8
Fig. 9
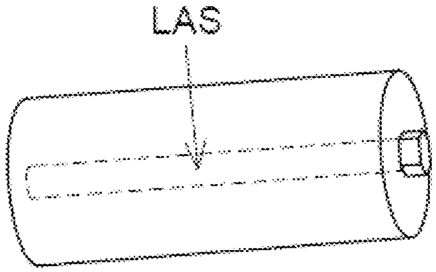
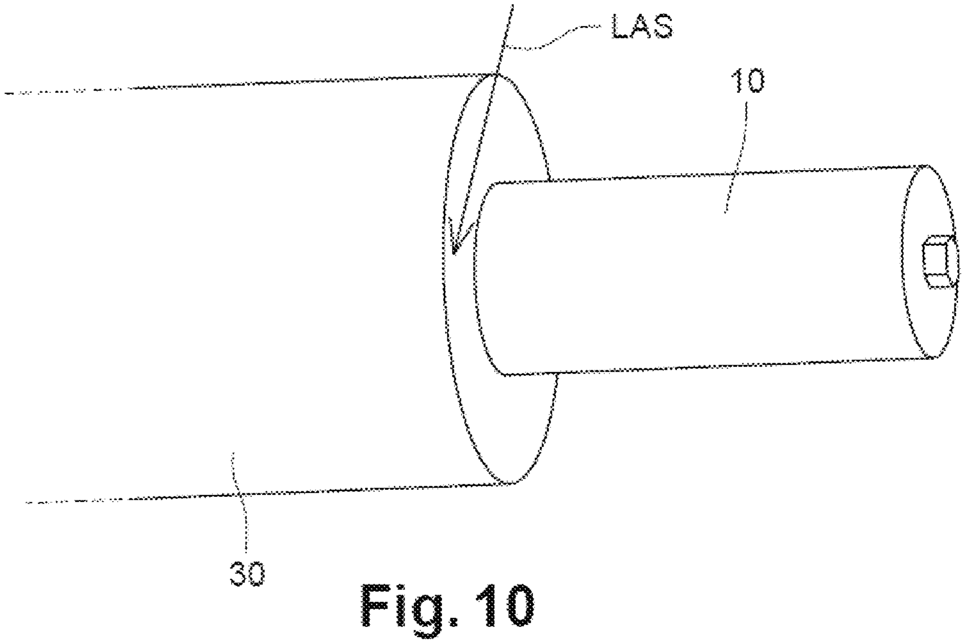
Fig. 10

PROCESS FOR PRODUCING, AT THE END OF A STRUCTURE, A MICRO-OR NANO-COMPONENT MADE OF VITREOUS MATERIAL PRODUCED BY MULTI-PHOTON PHOTOPOLYMERIZATION

TECHNICAL FIELD

The present application relates to the field of photonics and optical devices and in particular to making of a device formed of an optical and/or photonic component, made by additive manufacturing and having patterns with small dimensions, in particular micrometric or nanometric, which is arranged at the end or on a lateral region of a waveguide-type structure, in particular an optical fibre or an electronic board or a photonic circuit.

Prior Art

In the field of photonics and optical devices, new 3D printing or additive manufacturing processes have appeared in order to make optical components with patterns having small dimensions.

The document "Three-dimensional printing of transparent fused silica glass", by Kotz et al., Nature, vol. 544, 2017 discloses, for example, a process allowing creating optical structures provided with patterns having a size of several tens of micrometres, based on a silica powder in suspension within a resin capable of polymerising under the action of a light radiation.

Such a material is insolated using a so-called stereolithography process implementing a laser light source whose wavelength is partially absorbed by this material. A structured illumination allows triggering the polymerisation of the material in specific areas. In order to obtain a silica-based structure, the process consists afterwards in performing a high-temperature annealing of the structure in order to eliminate any organic trace and thus keep no silica glass anymore. With such a process, the resolution of the patterns is limited.

A so-called "two-photon polymerisation" process has appeared and allows manufacturing micro-structures or nano-structures with a high resolution, typically lower than one micrometre and which may be in the range of about one hundred nanometres. Two-photon polymerisation as a direct laser writing technique allows creating three-dimensional (3D) structures. This technique is based on the use of so-called "femtosecond" or "picosecond" lasers supplying laser pulses in the range of a few femtoseconds to several picoseconds, in particular several hundreds of picoseconds. The two-photon polymerisation uses an optical process based on the simultaneous absorption of two photons in a photosensitive material or in a material to which a photoinitiator has been added. When it is exposed to the laser, the material is modified by activating photoinitiators, which will cause the formation of free radicals. These free radicals will activate the monomer units and thus locally trigger the polymerisation reaction under the action of an activator herein consisting of the laser light. In the case of two-photon polymerisation, the photo-polymerisation reaction of the material takes place within the focal volume where the light energy associated with each light pulse originating from the laser is concentrated. Scanning this focal area within the volume of the material enables the creation of a three-dimensional structure in a subsequent step of the process, the non-polymerised material may be eliminated by dilution in a solvent.

Moreover, the assembly or anchorage of a micro-structured or nano-structured component made of a polymer on a carrier or an optical component or at the end of an optical fibre poses a problem.

Thus, the document "Optical fibre tip with integrated Mach-Zehnder interferometer for sensor applications", by Gaso et al., Advances in electrical and electronic engineering, vol. 17, 2019 discloses for example the making of a component provided with a Mach-Zehnder type interferometric structure whose patterns are made of a polymer material. In order to be arranged on the fibre, the component is herein fitted onto one end of the fibre. Hence, the connection between the fibre and the component is not solid: only the frictions between the two structures ensures holding of the 3D printed structure with the optical fibre. Moreover, a structure made of polymer is less thermally stable and has a less good optical transmission than a structure made of glass, for example silica.

It is known to transpose the use of the 2-photon polymerisation process to systems made of glass. Thus, the document by Kotz et al., "Two-photon polymerisation on nanocomposites for the fabrication of transparent fused silica glass microstructures", Adv. Material 2021 discloses a process of two-photon polymerisation of an organic material filled with silica particles to form a three-dimensional structure. Once exposed to the laser, the material is heat treated to eliminate the organic portion and thus carry out a sintering. This sintering is carried out at a high temperature higher than 1,000° C. A structure made of silica is ultimately obtained. Nonetheless, the heat treatment allowing eliminating the organic portion causes a modification of the dimensions of this structure, so-called "shrinkage", with a reduction factor which may be in the range of 30%. Hence, such a shrinkage might lead to a difficulty in accurate positioning of the component obtained in 3D printing at the end of an optical fibre. Indeed, it is necessary to ensure that the 3D printed structure remains aligned with the optical core ensuring the guidance of the light within the optical fibre, and thanks to which the micro-component could be characterised. This shrinkage also induces deformations at the carrier-component interface modifying the microstructure that is made and therefore the optical properties. This shrinkage also induces considerable stresses at the carrier-component interface, resulting in a "delamination" of the component off its carrier.

To solve this adhesion problem, it is possible to consider introducing one or more adhesion layer(s) between the fibre and the 3D structure, for example through the formation of silanes. Nonetheless, this approach might prove to be insufficiently robust for use in some types of environments, in particular at high temperature (higher than 600° C.), or in media in which considerable radiations and/or vibrations are present.

Thus, arises the problem of finding a novel method allowing making an assembly of a micro-structured or nano-structured optical and/or photonic component printed by multi-photon, in particular two-photon, polymerisation on a structure such as a waveguide and in particular an optical fibre and which is improved with regards to the drawbacks set out hereinabove.

DISCLOSURE OF THE INVENTION

An embodiment of the present invention relates to a process for making an optical device provided with a nano-structured or micro-structured component assembled on one end or a lateral surface of a structure, the process comprising the steps of:

- providing a carrier based on a first material, photosensitive and transformable into a vitreous material, and making on a first end of said carrier, by multi-photon, in particular two-photon, photopolymerisation, a micro-structured or nano-structured component, based on a second material photosensitive and transformable into a vitreous material,
- performing one or more heat treatment(s) so as to transform the first material of said carrier and the second material of said micro- or nano-structured component into a vitreous material and then,
- assembling and securing a region of a second end of said carrier opposite to said first end with an area of one end or a lateral surface of said structure.

The structure on which the nano-structured or micro-structured component is assembled may be an optical fibre or more generally an optical waveguide.

Typically, the carrier and the fibre are assembled by welding. This welding may be carried out by a material fusion process using an electric arc or using a laser fusion process.

Using an intermediate carrier also so-called a pedestal or pedestal carrier in order to be able to assemble the component with an optical fibre or waveguide allows protecting this component during this assembly where a localised fusion is carried out.

Assembling, by localised fusion, a carrier made of a vitreous material and a fibre also typically made of a vitreous material and typically made of silica also allow obtaining a solid assembly.

Providing the thermal annealing(s) before assembly between the fibre and the carrier allows favouring an accurate positioning of the carrier with respect to the fibre to the extent that, in this case, a post-assembly thermal shrinkage is avoided, such a shrinkage might be at the origin of a misalignment, in particular in the case of a non-homogeneous shrinkage.

Advantageously, the process may further comprise: a step of forming at least one waveguide in a volume of said carrier.

According to a possible implementation of the process, the waveguide(s) may be made in the form of a longitudinal central portion surrounded by longitudinal galleries formed when making said carrier by additive manufacturing.

According to a possible implementation of the process, the waveguide(s) may be formed after making said component on said carrier and prior to said one or more heat treatment(s).

Alternatively, it is possible to provide for making the waveguide(s) after assembling and securing said region of said carrier and said area of said structure.

According to a possible implementation of the process, the waveguide(s) may be made by direct writing by means of a laser in a volume of said carrier.

A particular implementation provides for making several waveguides in said carrier.

Advantageously, the carrier may be made by multi-photon, in particular two-photon, photopolymerisation. Thus, it is possible to form the carrier and the component during the same step or at least by means of the same piece of equipment.

The micro-structured or nano-structured component is typically an optical or photonic component, or a sensor provided with an optical or photonic component. This optical or photonic component may be selected in particular from among the following components: an interferometer, a lens or a lens array, a set of Fresnel lens, a diffractive structure, a diffraction grating, a diffractive optical element, a mode adapter, a fibre core combiner, a resonant cavity for optical or acoustic waves.

Advantageously, the material of said carrier and/or the material of said component is:

- a polymer compound filled with particles of a vitreous material such as silica particles, or
- a sol-gel material.

According to another aspect, an embodiment of the present invention provides an optical device provided with a nano-structured or micro-structured component assembled on one end of an optical fibre, via a carrier made of a vitreous material on which the nano-structured or micro-structured component is arranged, the carrier being welded to an area of said optical fibre and including a waveguide which extends between said component and the optical fibre.

BRIEF DESCRIPTION OF THE DRAWINGS

The present invention will be better understood upon reading the description of embodiments given, merely for indicative and non-limiting purposes, with reference to the appended drawings wherein:

FIGS. 7, 8 and 9 are intended to illustrate an embodiment of a waveguide in a pedestal post after heat treatment aiming to transform the material of this carrier into a vitreous material.

FIGS. 10 and 11 are intended to illustrate an embodiment of a waveguide in a pedestal carrier after assembly of this carrier with an optical fibre;

Identical, similar or equivalent portions of the different figures bear the same reference numerals so as to facilitate passage from one figure to another.

The different portions shown on the figures are not necessarily plotted according to a uniform scale, to make the figures more legible.

DETAILED DISCLOSURE OF PARTICULAR EMBODIMENTS

Figure 1:
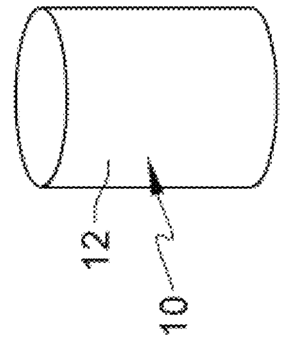
FIGS. 1 and 2 are intended to illustrate a step of forming by additive manufacturing a pedestal carrier made of a material photosensitive and transformable into a vitreous material.
Figure 2:
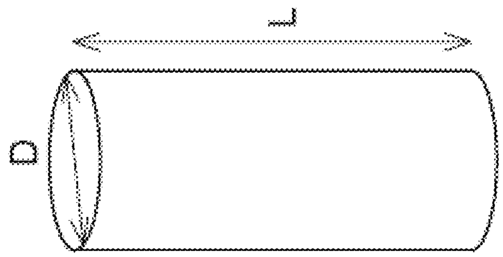

Reference is now made to FIGS. 1 and 2 intended to illustrate a step of forming a carrier 10, also so-called "pedestal", intended to accommodate an optical and/or photonic, micro- or nano-structured element or component.

In the illustrated example, the carrier 10 has a cylinder shape in particular an axisymmetric cylinder with a length L which may typically be comprised between 0.1 and 10 mm, for example in the range of 1 mm and a width D (in this example corresponding to the diameter of its base) which may be comprised between 10 microns and several millimetres in diameter. This dimension D may itself depend on the diameter of an optical fibre with which this carrier is intended to be assembled later on and on a narrowing factor, also so-called "thermal shrinkage", that the carrier 10 might undergo during a subsequent heat treatment step aiming to modify its composition. Preferably, the diameter of the carrier 10 is provided so that it is contained within the end of the optical fibre with which it is assembled. At this stage, the carrier 10 may be provided with a diameter larger than that of the fibre 30 and large enough to enable it to be adjusted to that of the fibre 30 after thermal shrinkage. For example, the dimension D may be comprised between 100 and 400 μm, in particular if an optical fibre with an outer diameter of 80 μm or 250 μm is considered.

The geometric shape of the carrier 10 is not limited to the illustrated example and the carrier 10 may possibly have shapes other than a cylinder, for example a parallelepipedal shape, or a hexagonal-based cylinder shape. The carrier 10 being typically made by additive manufacturing, its dimensions may also depend on the used manufacturing process and in particular on the capacities of the printing machine used to carry out this manufacture.

A pedestal carrier 10 with narrowed shape from one of its ends to the other one or having a curvature may be provided.

Advantageously, the additive manufacturing process is a multi-photon, in particular two-photon, photopolymerisation process but other printing techniques with lower resolutions, for example a single-photon photopolymerisation, may be used for this step or a three-photons or multi-photon photopolymerisation.

During this step, it is possible to use, for example, a 3D printing machine like that one commercialised the Nanoscribe company under the brand Photonic professional GT2®. The working wavelength of the used laser is adapted by a person skilled in the art according to the used material of the carrier 10.

Thus, the carrier 10 may be formed based on a material 12, such as a resin or a polymer, transformable into a vitreous material and in particular filled with photoinitiators. A polymer compound filled with particles of a vitreous material or a so-called "sol-gel" material allowing obtaining a vitreous material through a sol-gel process may be used.

In the case of a photosensitive material in the form of a polymer compound filled with particles, these particles of a vitreous material, such as silica particles ($SiO_2$), typically consist of nano-particles. By "nano-particles", it should be understood particles having a dimension comprised between 1 nm and 100 nm, and in particular between 10 nm and 50 nm.

According to a particular embodiment, the material 12 of the carrier may be a material as described in the document by Doualle et al., "3D printing of silica glass through a multiphoton polymerization process", 2021 formed from a mixture of a HEMAhydroxyl-ethyl-methacrylate type monomer in a phenoxyethanol (POE) solvent. Silica nanoparticles, for example with a diameter of several tens of nanometres, in particular in the range of 40 nm, are scattered in this preparation. A photoinitiator (2,2-dimethoxy-2-phenylacetophenone) is added to allow carrying out a two-photon polymerisation.

According to another particular embodiment, a material as described in the article "Three-dimensional printing of transparent fused silica glass" by Frederik Kotz et al., published in the Nature magazine in 2017, is used as a precursor material 12. Small-diameter silica particles are scattered within a monomer. Insolation using a laser allows triggering a polymerisation during the three-dimensional printing of the carrier 10.

According to another embodiment, a material 12 as described in the article "Two-photon polymerisation of nanocomposites for the fabrication of transparent fused silica glass microstructures" by Frederik Kotz et al., published in March 2021 in the "Two Advanced Materials" magazine, is used. The material 12 herein consists of a resin manufactured by the Glassomer company and filled with silica nano-particles scattered within a monomer.

According to another possibility, a compound with $TiO_2$/$SiO_2$ particles and as described, for example, in the document "Microfabrication by two-photon lithography, and characterisation, of $SiO_2$/$TiO_2$ based hybrid and ceramic micro-structures" by Desponds et al., Journal of Sol-Gel Science and Technology volume 95, pages 733-745 (2020) may be used.

Thus, the used material may be a polymer filled with types of particles of a vitreous material other than silica particles. In particular, it is possible to use $TiO_2$ nanoparticles or alumina nanoparticles, or silica nanoparticles doped with a rare-earth element, for example Erbium, or Germanium-doped silica nanoparticles.

According to another possible implementation, a sol-gel compound including alkoxide-type precursors allowing obtaining a vitreous material by polymerisation and heat treatment may be used. Such a material type is described, for example, in the document "Sol-Gel Derived Optical and Photonic Materials", Woodhead Publishing Series in Electronic and Optical Materials, 2020, pages 315-346. Such a material type confers more flexibility to obtain a doped vitreous material. The obtained material is then typically more homogeneous than a material including silica nanoparticles.

In the case where the carrier 10 is formed by two-photon polymerisation (TPP standing for "Two Photons Polymerisation"), a picosecond or femtosecond laser is typically used to perform this manufacture. The laser may have a wavelength in the infrared, for example at 1,030 nm, or in the near-infrared, for example at 800 nm, or in the visible. The laser pulses may have a duration in the range from several femtoseconds to 700 ps, typically between several femtoseconds and several picoseconds.

A doubling or tripling of the frequency range with wavelengths respectively at 515 nm, 400 nm, 266 nm may also be implemented. The energy of the laser may be provided between 1 nanoJoule and about ten milliJoules. Alternatively, it is also possible to provide for a series of pulses according to a frequency for example in the range of several tens of MHz or one single pulse.

Figure 3:
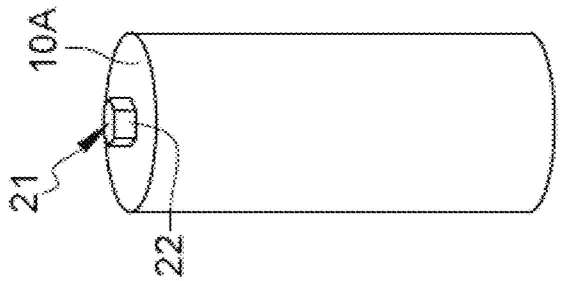
FIG. 3 is intended to illustrate a step of forming a micro- or nano-structured component at the end of the pedestal carrier, the component also being made of a material photosensitive and transformable into a vitreous material.

Afterwards, a micro-structured or nano-structured component 21 is manufactured (FIG. 3) on a first end 10A of the carrier 10. By "micro-structured" component 21, it should be understood an element 21 including 3-dimensional patterns and in particular patterns with minimum dimensions typically comprised between 0.1 μm and 100 μm. By "nano-structured" component 21, it should be understood that the component 21 includes 3-dimensional patterns with minimum dimensions typically comprised between 1 and 100 nanometres. The component 21 that is made may be an optical or photonic component, for example a micro- or nano-interferometer, in particular a Fabry-Perot interferometer. Other structures, such as, for example, a planar, concave or convex mirror, a lens, a Fresnel lens, a lens array, or a set of Fresnel lenses, a diffractive structure, a diffraction grating, a diffractive optical element or an imaging device objective may also be manufactured, but also a localised Raman effect exaltation textured structure, a mode adapter or a combiner for fibre lasers, in particular high-power lasers, where the silica is an indispensable material.

The optical or photonic component may be used to make a sensor intended to be arranged at the tip of an optical fibre and allowing performing measurements of physical parameters such as the pressure, the temperature, a deformation, acoustic waves or chemical/biological parameters such as the concentration of a target biochemical species, for example according to antibody-antigen type reactions.

Thanks to the pedestal, the optical component may be added onto a microfluidic circuit either to implement an optical analysis or detection or to perform an optical treatment for example on cells that pass through microfluidic channels of the microfluidic circuit.

Preferably, the component 21 is herein made by multi-photon, and in particular two-photon, photopolymerisation because of the resolution enabled by this process. The component 21 may be formed based on a material 22 photosensitive and transformable into a vitreous material. The material 22 may be a polymer compound filled with particles of a vitreous material or a sol-gel material, and in particular such as those mentioned before for the pedestal.

It is possible to form the pedestal carrier 10 and the micro-structured or nano-structured component 21 based on the same material. The pedestal carrier 10 and the micro-structured or nano-structured component 21 may also be made by the same piece of equipment, in particular the same additive manufacturing equipment, for example the same piece of equipment configured to carry out a multi-photon photopolymerisation, in particular a two-photon polymerisation. Thus, advantageously, the carrier 10 and the component 21 may be made in the same multi- or two-photon photopolymerisation step.

In this case, an objective or lens change is typically carried out while a step is in progress to the extent that the dimensions of the component 21 are typically much smaller than those of the carrier 10.

Figure 4:
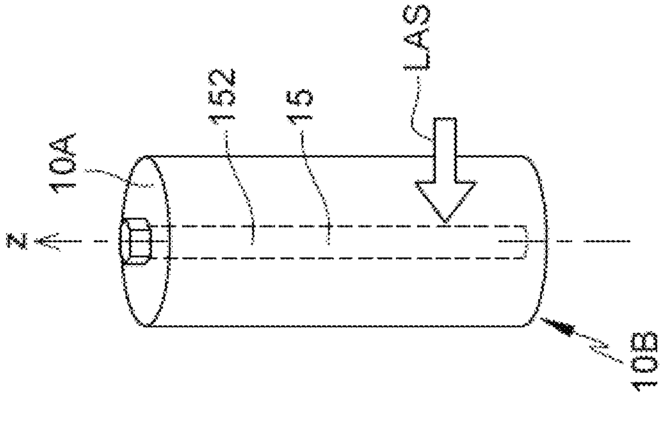
FIG. 4 is intended to illustrate a step of forming a waveguide in the volume of the pedestal carrier and extending from one end to another end on which said component is located.

In the particular embodiment illustrated in FIG. 4, after having formed the component 21, at least one waveguide 15 is made afterwards passing through the carrier 10 from the end 10A on which the component 21 is located up to a second end 10B of the carrier opposite to the first end.

For this purpose, it is typically possible to perform an exposure of a central volume 152 which passes longitudinally through said carrier 10 to a laser LAS. This exposure is implemented so as to locally modify the material 12 of the carrier and for example modify the refractive index of this central volume or locally modulate its refractive index in particular so as to achieve an alternation of the refractive index, for example to form a Bragg grating. For example, such a grating may be used to measure a temperature, a pressure, or mechanical deformations.

In this case, a laser could also be used to perform this step. Typically, the laser radiation insolates the carrier 10 radially, in other words is directed in a radial direction with respect to a Z axis in which the carrier 10 extends.

Figure 13:
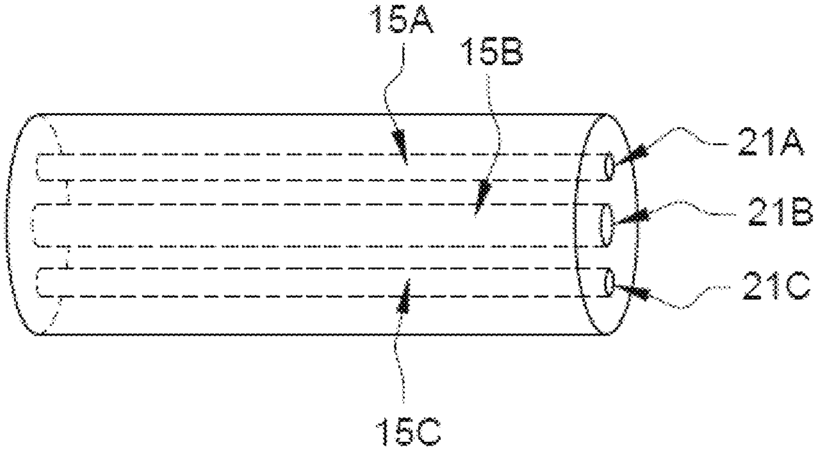
FIG. 13 is intended to illustrate a pedestal carrier crossed by several waveguides, each waveguide could be associated with a component.

In the embodiment illustrated in FIG. 4, one single waveguide 15 is made but it is alternatively possible, as illustrated in FIG. 13, to provide for making several waveguides 15A, 15B, 15C. This could be the case in particular when several micro- or nano-structured components 21A, 21B, 21C are formed at the end of the carrier 10. The laser used to form the waveguide(s) may be a femtosecond or picosecond laser as described before.

The waveguide that is made does not necessarily follow a rectilinear direction parallel to the longitudinal axis of the optical fibre.

Waveguides created with curvatures may be implemented.

Figure 14:
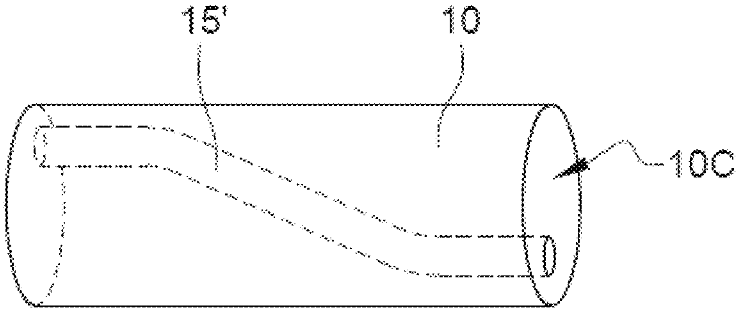
FIG. 14 is intended to illustrate a waveguide in a pedestal carrier, the waveguide having a curved geometry and opening into an off-centred end area of the pedestal carrier.

Thus, it is possible to make at least one waveguide 15' having a curved shape and opening like in the example illustrated in FIG. 14, in an offset manner at the end 10A of the pedestal carrier 10.

Figure 15:
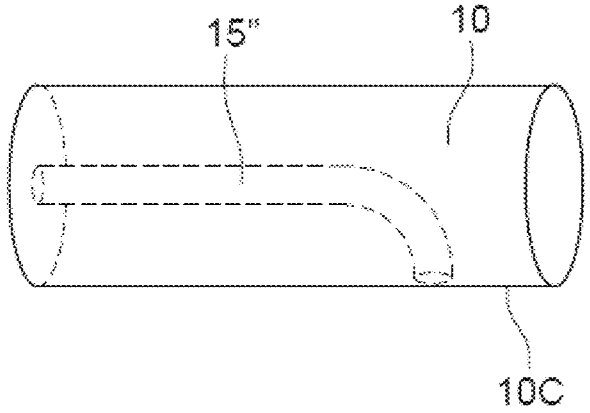
FIG. 15 is intended to illustrate a waveguide of a pedestal carrier having a curved geometry and opening into a lateral region of the carrier.

In another embodiment illustrated in FIG. 15, the waveguide 15" is fitted with an end opening onto a lateral surface 10C of the carrier 10.

Afterwards, one or more thermal annealing(s) are performed in order to eliminate an organic portion of the constituent material(s) 12, 22 of the carrier 10 and of the component 21 and to transform this carrier 10 and this component respectively into a carrier and into a component made of vitreous materials. The annealing temperature(s) is or are typically comprised between 300° C. and 1,700° C., and depend(s) on the used photosensitive material and in particular on whether it consists of a filled polymer or a sol-gel material.

In the case of a polymer photosensitive material filled with particles, one or more annealing(s) are performed so as to carry out a decomposition of the polymer(s) as well as a sintering. In this case, the sintering annealing is carried out at a temperature typically comprised between 1,000° C. and 1,500° C., typically between 1,100° C. and 1,400° C.

The annealing may also be performed by supercritical drying, which allows reducing the treatment time as well as the annealing temperature. For example, such an annealing type may be used in the case of a sol-gel material.

For a supercritical drying, the pressure and the temperature of the solvent exceed the coordinates of a critical point C at a critical temperature Tc and a critical pressure Pc. Critical parameters Tc, Pc of a solvent for a critical drying at low temperature are given as example in the table hereinbelow.

TABLE 1-5

Paramètres critiques de solvants pour séchage supercritique à basse température

| Solvant | $T_C$ (° C.) | $P_C$ (bar) |
|---|---|---|
| Dioxyde de carbone ($CO_2$) | 31.1 | 73.8 |
| Protoxyde d'azote ($N_2O$) | 36.5 | 72.4 |
| Fréon 13 ($CClF_3$) | 28.9 | 38.6 |
| Fréon 23 ($CHF_3$) | 25.9 | 48.2 |

In the aforementioned article "Two-photon polymerisation of nanocomposites for the fabrication of transparent fused silica glass microstructures", a sintering temperature in the range of 1,300° C. is applied for 2 h under a 0.05 mbar (5 Pa) vacuum for the considered precursor.

In general, the annealing temperature range depends on the used polymer material. In the case where this polymer is filled with silica particles, temperatures comprised between 800° C. and up to 1,300-1,500° C. are preferably used. Other glasses require lower sintering temperatures starting from 300° C.-400° C.

Figure 5A:
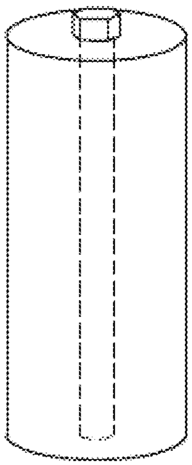
FIGS. 5A and 5B are intended to illustrate a heat treatment step for transforming the material of the pedestal carrier and of the component into a vitreous material and typically leading to a reduction in their dimensions.
Figure 5B:
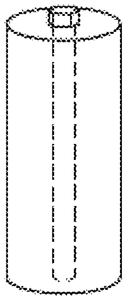

As indicated before, the thermal annealing(s) and in particular the sintering annealing may lead to a narrowing also so-called "thermal shrinkage" of the structure as illustrated in FIGS. 5A-5B, where a reduction in the respective dimensions of the carrier 10 and of the component 21 fastened on this carrier could be observed.

Once the composition of the carrier 10 and of the component 21 has been modified, it is possible afterwards to assemble and secure the structure formed by this carrier 10 and this component 21 on an optical fibre 30. The optical fibre 30, or at least its core 32, or at least one area on which the carrier 10 is to be fastened, is herein provided made of a vitreous material, for example a silica glass.

Figure 6:
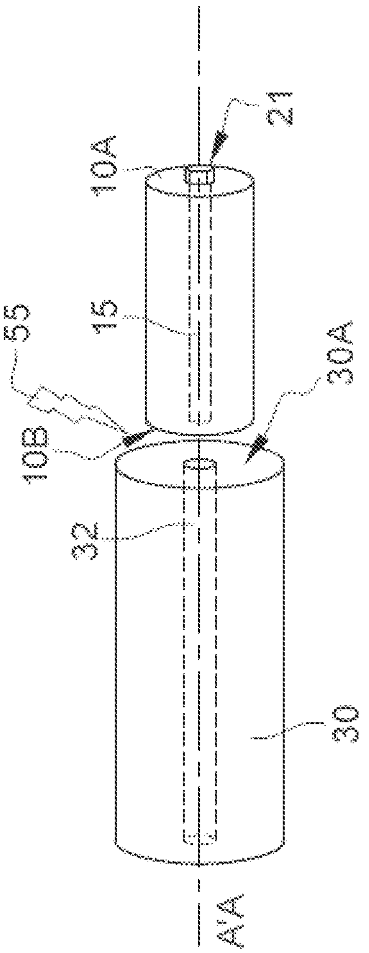
FIG. 6 is intended to illustrate a step of assembling the pedestal carrier provided with the component with an end area of an optical fibre.

In the embodiment illustrated in FIG. 6, the carrier 10 is arranged on one end 30A of the fibre 30 and in particular so that the waveguide 15 created in the carrier 10 is arranged in the extension of the core 32 of the fibre 30. Thus, the core 32 and the guide 15 are brought to be arranged against each other on the same axis A'A parallel to the respective longitudinal axes of the fibre 30 and of the carrier 10. Before securing the fibre and the carrier 10, this optical fibre 30 and the waveguide 15 are aligned. Afterwards, a region of one end 10B of the carrier 10 opposite to that 10 A on which the component 21 is formed is secured to an end area 30A of the optical fibre 30. To perform this securing, a localised fusion of this region and of this area is carried out. For example, a welding process as commonly used in order to weld together optical fibres made of silica and implementing an electric arc 55 may be used.

The assembly between the carrier 10 and the fibre 30 allows securely bonding the component 21 on the fibre 30 while preserving this component 21 and avoiding damaging its patterns which could be fragile. Indeed, in this case, it is not the component 31 which is directly melted and joined to the fibre 30 but the intermediate carrier 10. Thus, the assembly between the carrier 10 made of a vitreous material and the fibre 30 is more solid than it would be if an element made of polymer material has been assembled on this fibre 30. Moreover, carrying out the assembly between the fibre 30 and the carrier 10 while the thermal annealing(s) having led to a thermal shrinkage have already been performed and these two elements are made of a vitreous material, allows obtaining a more accurate positioning than it would be if the shrinkage annealing has been carried out after assembly with the fibre. Indeed, the carrier 10 and the component 21 could have undergone a shrinkage whereas the optical fibre 30 has not undergone any.

Alternatively to an electric arc welding, the secure assembly between the fibre 30 and the carrier 10 may be performed by laser insolation. For example, a $CO_2$ laser whose beam is advantageously set in the form of a ring may be used. Several laser beams allowing, for example, heating the fibre on each side may be used. The use of a laser for this step enables an accurate and localised control of the heating applied to the regions to be melted and bonded together. The optical power of the laser may be modulated according to the extent of the treated areas and/or the amount of material to be melted, a lower power could be used when the areas to be bonded have a reduced extent, whereas for a carrier 10 whose end is provided with dimensions corresponding to those of the optical fibre 30, a higher power may be used.

Alternatively or in combination, the connection between the fibre 30 and the carrier 10 may be achieved using mechanical alignment means, for example using a sheath clasping a piece of the fibre 30 and a piece of the carrier 10.

According to a variant of the previously-described process, it is possible to use a three-dimensional printing technique for the carrier 10 other than the two-photon photopolymerisation, in particular a process using a single-photon polymerisation technology. This could be the case in particular when a very fine resolution is not necessary to make the shape of this carrier.

Figure 7:
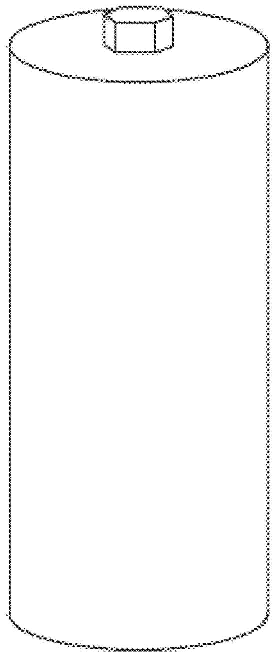

According to another variant illustrated in FIGS. 7 to 9, it is possible to make the waveguide 15 in the carrier 10 possibly after the annealing step(s) leading to a transformation of the material(s) into a vitreous material(s).

Thus, after the annealing(s) leading to the thermal shrinkage of the carrier and of the associated component (FIGS. 7 and 8), the carrier 10 is exposed to a laser L, for example to the femtosecond laser used before. This allows avoiding a possible erasure or a possible deterioration of the waveguide 15 created in particular when the shrinkage annealing temperature is too high.

Figure 11:
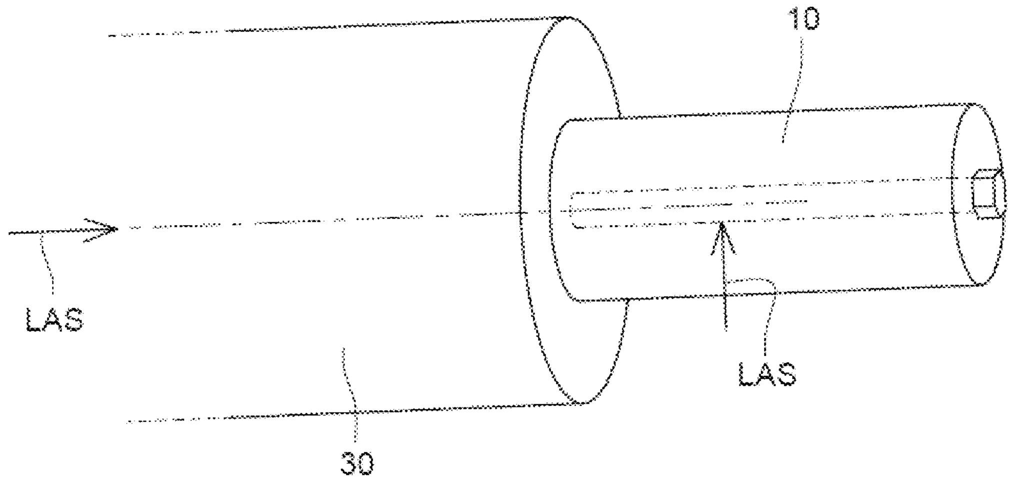

According to another variant illustrated in FIGS. 10 and 11, it is also possible to manufacture the waveguide 15, after the carrier 10 has been assembled and secured to the optical fibre. Thus, in the embodiment illustrated in FIG. 10, a welding is performed between the optical fibre 30 and the carrier 10, for example using a laser. Afterwards, in this case, when making the waveguide 15, it is preferable to keep the optical fibre 30 and the carrier 10 aligned, the fibre 30 being preferably kept tensioned between its ends.

Figure 12:
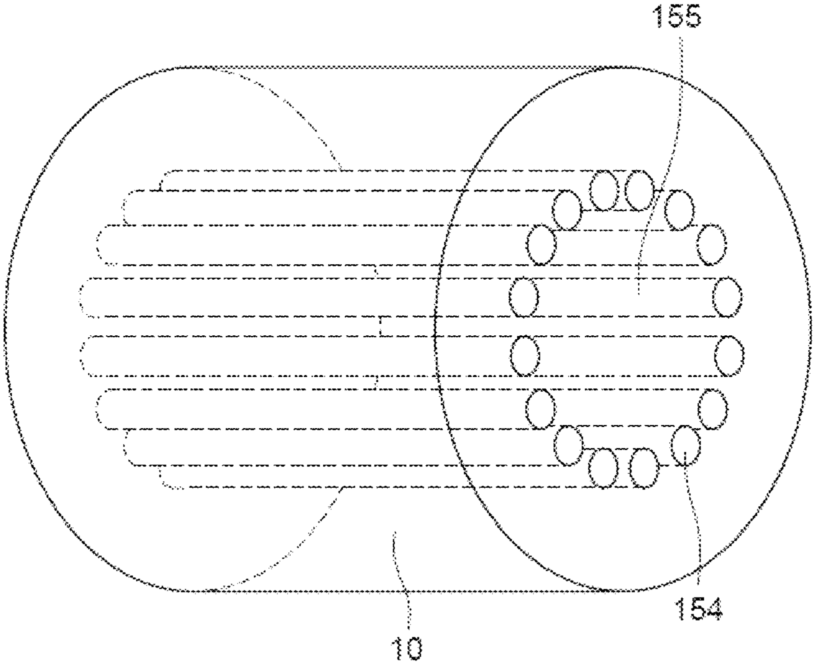
FIG. 12 is intended to illustrate a step of forming a pedestal carrier by additive manufacturing, the carrier being provided with hollow galleries delimiting a waveguide.

Besides the possibility of making a waveguide 15 formed in a solid volume of the carrier 10 and fitted with at least one channel made of a material having an optical index different from that of the rest of the carrier 10, it is possible to provide for making this waveguide 15 like in FIG. 12 in the form of a portion 155 surrounded by hollow galleries 154, in other words empty hollow channels or micro-structured and empty channels.

In either one of the embodiments illustrated in FIGS. 4, 9, 11, 12, 13, the waveguide(s) made has/have a rectilinear shape. Alternatively, as indicated before, it is possible to form at least one waveguide with a different shape, for example a curved or helical shape, or to make, in the carrier 10, one or more rectilinear waveguide(s) as well as at least one waveguide 15 with another shape, for example curved or helical.

Figure 16:
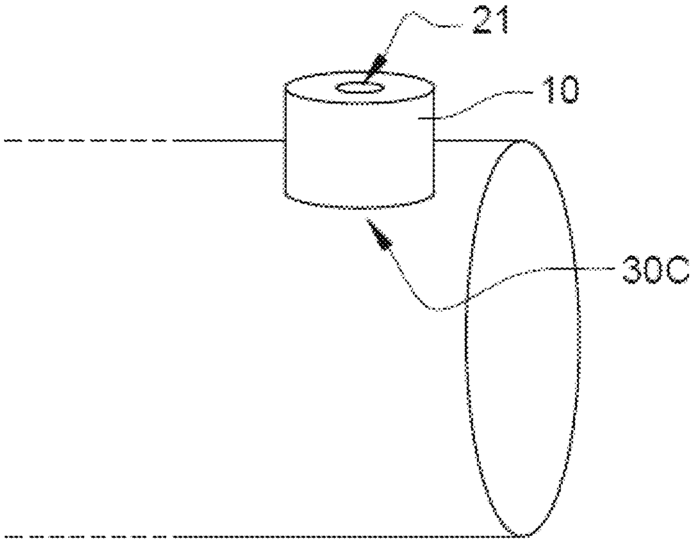
FIG. 16 is intended to illustrate a pedestal carrier provided with a component and assembled on a lateral region of an optical fibre.

According to another possible embodiment, the carrier 10 for receiving micro/nano components 21 may be arranged on a wall or a lateral region 30C of a fibre. In the embodiment illustrated in FIG. 16, this lateral region 30C is the curved outer surface of a fibre 30 shaped as an axisymmetric cylinder. It is also possible to provide for arranging such a carrier 10 on a planar lateral region of a fibre 30 with a "D"-shaped section or including a flat surface or a substantially flat and locally polished area.

In the case where the carrier 10 is assembled on a lateral region of an optical fibre, a laser beam welding process is typically preferred.

The assembly of the pedestal carrier 10 provided with at least one micro- or nano-structured component has been described in the particular case of an optical fibre but could be carried out more generally on an optical waveguide or another type of structures such as, for example, a photonic circuit board.

The invention claimed is:

1. A method for making an optical device provided with a nano-structured or micro-structured component assembled on one end or a lateral surface of a structure, comprising:

providing a carrier based on a first photosensitive material, the first photosensitive material being transformable into a vitreous material, and, making on a first end of the carrier, the nano-structured or micro-structured component by multi-photon photopolymerization or two-photon photopolymerization, the nano-structured or micro-structured component being based on a second photosensitive material that is transformable into a vitreous material, performing one or more heat treatments so as to transform the first photosensitive material of the carrier and the second photosensitive material of the nano-structured or micro-structured component into the vitreous material, and assembling and securing a region of a second end of the carrier that is opposite to the first end with an area of the one end or the lateral surface of the structure.

2. The method according to claim 1, the method further comprising forming at least one waveguide in a volume of the carrier.

3. The method according to claim 2, wherein the at least one waveguide is made in a form of a longitudinal central portion surrounded by longitudinal galleries formed when making the carrier by additive manufacturing.

4. The method according to claim 2, wherein the at least one waveguide is formed after making the nano-structured or micro-structured component on the carrier and prior to the one or more heat treatments.

5. The method according to claim 4, wherein the at least one waveguide is made by direct writing by using a laser in the volume of the carrier.

6. The method according to claim 2, wherein the at least one waveguide is formed after the one or more heat treatments.

7. The method according to claim 2, wherein the at least one waveguide is formed after assembling and securing the region of the second end of the carrier and the area of the one end or the lateral surface of the structure.

8. The method according to claim 2, wherein several waveguides are formed in the carrier.

9. The method according to claim 1, wherein the carrier is made by the two-photon photopolymerization or the multi-photon photopolymerization.

10. The method according to claim 1, wherein the first photosensitive material and the second photosensitive material are identical.

11. The method according to claim 1, wherein the first material and/or the second material is:

a polymer compound filled with particles of the vitreous material, or a sol-gel material.

12. The method according to claim 11, wherein the particles are silica particles.

13. The method according to claim 1, wherein the carrier and the nano-structured or micro-structured component are formed in a same step or in successive additive manufacturing steps, an optical objective change being then performed between the successive additive manufacturing steps.

14. The method according to claim 1, wherein the nano-structured or micro-structured component is an optical or photonic component, or a sensor fitted with an optical or photonic component, selected from among an interferometer, a lens or a lens array, a set of Fresnel lenses, a diffractive structure, a mode adapter, a beam combiner, or a resonant cavity for optical or acoustic waves.

15. The method according to claim 1, wherein the assembling and securing the region of the second end of the carrier with the area of the one end or the lateral surface comprises localized fusion of the region of the second end of the carrier and the area of the one end or the lateral surface, respectively of the carrier and the structure.

16. The method according to claim 1, wherein the structure is an optical guide or an optical fibre.

* * * * *